UNITED STATES PATENT OFFICE.

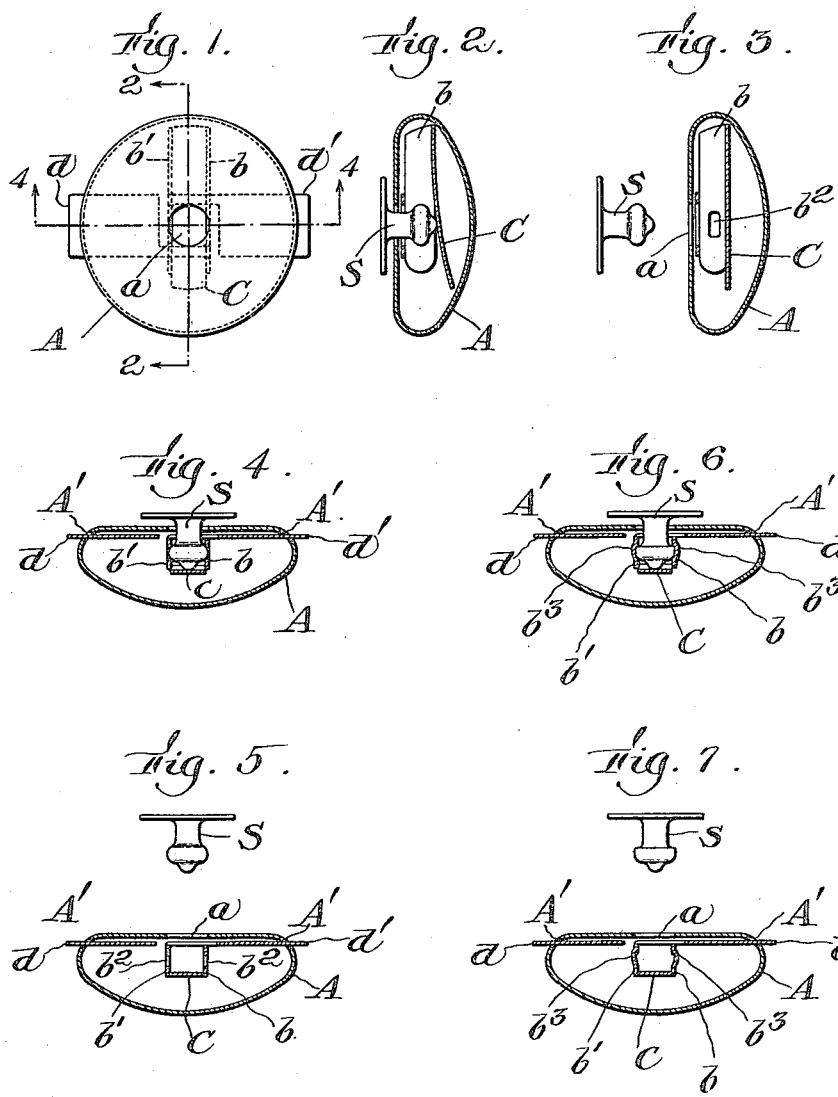

LOUIS ARKIN, OF BOSTON, MASSACHUSETTS.

FASTENER.

1,225,741.    Specification of Letters Patent.    Patented May 15, 1917.

Application filed October 9, 1916.   Serial No. 124,484.

*To all whom it may concern:*

Be it known that I, LOUIS ARKIN, a citizen of the United States, and resident of Boston, in the county of Suffolk and State of Massachusetts, have invented new and useful Improvements in Fasteners, of which the following is a specification.

This invention relates to separable fasteners of the type comprising complemental stud and socket members commonly employed as a fastening means for gloves, dresses, and the like. In the fasteners of this general class with which I am familiar, the stud is disengaged from the socket by jerking or pulling it therefrom and the provision made for retaining the stud within the socket so securely as to prevent accidental disengagement, makes it difficult readily to disengage the stud without the application of considerable force. The result is that in the use of these fasteners upon light and delicate fabrics, such as silks and laces, the disengagement of the fastener often tears and ruins the material to which it is secured. It is the principal object of this invention to provide a fastener wherein the stud is securely held within the socket but can be readily disengaged without danger of injury to the material to which the fastener is secured.

Referring to the drawings which illustrate certain embodiments of my invention,—

Figure 1 is a bottom view of the socket member;

Fig. 2 is a section on the line 2—2, Fig. 1, showing the stud in engagement with the socket;

Fig. 3 is a similar view showing the parts disengaged;

Fig. 4 is a section on the line 4—4, Fig. 1, showing the stud in engagement with the socket;

Fig. 5 is a similar view showing the parts disengaged; and

Figs. 6 and 7 are views similar to Figs. 4 and 5, respectively, and show a modified form of socket.

A is a metal casing of usual contour and construction having a stud receiving aperture $a$ and a pair of oppositely arranged apertures or slots $A'$. Within said casing is a stud retaining and releasing device consisting of a pair of resilient stud retaining arms $b$, $b'$, spaced apart and extending on opposite sides of said stud receiving aperture $a$. In the preferred form of my invention shown in Figs. 1 to 5, inclusive, each of said stud retaining arms $b$, $b'$, is provided with a stud aperture or socket $b^2$, best shown in Figs. 3 and 5, adapted to receive the head of the stud S when the latter is passed through the aperture $a$ into the casing. C is a spring arm secured at one end between said retaining arms $b$, $b'$, located in the path of said stud S and adapted to be engaged by said stud upon its insertion into the socket.

$d$, $d'$ are stud releasing arms projecting outside the casing through the slots $A'$ therein, each connected with the more remote stud retaining arm, i. e. the releasing arm $d$ is connected with the stud retaining arm $b$ and the releasing arm $d'$ is connected to the retaining arm $b'$. Each of said arms $d$, $d'$ is preferably of the form shown, notched or cut away as best shown in Fig. 1 so as not to obstruct the stud retaining aperture $a$ of the casing A.

Preferably the retaining arms $b$, $b'$, the spring C and the releasing arms $d$, $d'$, are formed of a single piece of metal stamped, slashed and bent into the desired form. While for purposes of economy, I prefer to form the said parts integral and from a single piece, it will be understood that they may, if desired, be made of independent pieces suitably secured.

The fastener shown in Figs. 6 and 7 is of the same construction as that described except that instead of the stud retaining apertures or sockets $b^2$, the stud retaining arms $b$, $b'$ are provided with the indentations or sockets $b^3$ adapted to receive the head of the stud S.

When the stud S is inserted into the casing A through the stud retaining aperture $a$, it passes between the resilient stud retaining arms $b$, $b'$ and, engaging the spring C, lifts the latter from normal position, best shown in Fig. 3, to working position, best shown in Fig. 2, the said spring being carried upward by the stud until the stud head enters the retaining apertures $b^2$ which firmly hold and retain the stud within the socket preventing its accidental disengagement, the spring C being stressed by the stud.

To disengage the stud and socket, the stud releasing arms $d$, $d'$ are simultaneously pressed inward thus spreading the retaining arms $b$, $b'$ so that the stud S is free to leave the retaining apertures $b^2$ and the spring C being thus released jumps the stud from the socket.

A socket member constructed in accordance with my invention as above described is strong and simple in construction and by reason of the fact that the stud retaining and releasing device is or may be constructed of a single piece, can be cheaply and economically made. The provision for releasing the stud by the arms $d$, $d'$ and spring C rather than by forcibly pulling or jerking it from the socket permits the use of the fastener upon the most delicate fabrics without danger of tearing the material upon the disengagement of the parts.

I claim:

1. A socket member of a fastener, comprising a casing having a stud receiving aperture, stud retaining means within said casing, and a resilient member adapted to force the stud from the socket without manipulation of said stud.

2. A socket member of a fastener, comprising a casing having a stud receiving aperture, stud retaining means within said casing, stud releasing means extending outside said casing and adapted to coöperate with said retaining means to release the stud, and a resilient member within said casing adapted to force the stud from the socket without manipulation of said stud.

3. A socket member of a fastener, comprising a casing having a stud receiving aperture, stud retaining means within said casing, stud releasing means projecting outside said casing and adapted to coöperate with said retaining means to release the stud, and a resilient member within said casing adapted to be engaged and stressed by the stud upon its insertion into the casing and to force the stud from the socket without manipulation of the stud.

4. A socket member of a fastener, comprising a casing having a stud receiving aperture, a pair of stud retaining arms within said casing spaced apart and extending on opposite sides of said stud receiving aperture, stud releasing means extending outside said casing and adapted to coöperate with said retaining arms to release the stud, and a resilient member adapted to be engaged and stressed by the stud upon its insertion into the casing and to force the stud from the socket without manipulation of the stud.

5. A socket member of a fastener, comprising a casing having a stud receiving aperture, a pair of stud retaining arms within said casing spaced apart, provided with sockets and extending on opposite sides of said stud receiving aperture, stud releasing means extending outside said casing and adapted to coöperate with said retaining arms to release the stud, and a resilient member adapted to be engaged and stressed by the stud upon its insertion into the casing and to force the stud from the socket without manipulation of the stud.

6. A socket member of a fastener, comprising a casing having a stud receiving aperture, a pair of stud retaining arms within said casing spaced apart and extending on opposite sides of said stud receiving aperture, means engaging said retaining arms and extending outside said casing adapted to spread said retaining arms to release the stud, and a resilient member adapted to be engaged and stressed by the stud upon its insertion into the casing and to force the stud from the socket without manipulation of the stud.

7. A socket member of a fastener, comprising a casing having a stud receiving aperture, a pair of stud retaining arms within said casing spaced apart and extending on opposite sides of said stud receiving aperture, releasing arms extending outside said casing each connected with its more remote retaining arm and adapted to spread said retaining arms to release the stud, and a resilient member adapted to be engaged and stressed by the stud upon its insertion into the casing and to force the stud from the socket without manipulation of the stud.

8. A socket member of a fastener, comprising a casing having a stud receiving aperture, a pair of stud retaining arms within said casing spaced apart, provided with sockets and extending on opposite sides of said stud receiving aperture, stud releasing arms extending outside said casing each connected with its more remote retaining arm and adapted to spread said retaining arms to release the stud, and a resilient member adapted to be engaged and stressed by the stud upon its insertion into the casing and to force the stud from the socket without manipulation of the stud.

9. A socket member of a fastener, comprising a casing having a stud receiving aperture, a pair of stud retaining arms within said casing spaced apart, provided with sockets and extending on opposite sides of said stud receiving aperture, stud releasing arms extending outside said casing each connected with its more remote retaining arm and adapted to spread said retaining arms to release the stud, and a resilient member anchored between said retaining arms, adapted to be engaged and stressed by the stud upon its insertion into the casing and to force the stud from the socket without manipulation of the stud.

10. A socket member of a fastener, comprising a casing having a stud-receiving aperture, stud retaining means wholly contained within said casing and independent thereof, and a resilient member adapted to force the stud from the socket without manipulation of said stud.

11. A socket member of a fastener, comprising a casing having a stud-receiving aperture, stud retaining means wholly contained within said casing and independent thereof, and a resilient member within said casing adapted to be engaged and permanently stressed by the stud upon its insertion into the casing, and to force the stud from the socket without manipulation of said stud.

Signed by me at Boston, Massachusetts, this fifth day of October 1916.

LOUIS ARKIN.